United States Patent
Baruch

[15] 3,673,587
[45] June 27, 1972

[54] LIQUID LEVEL INDICATOR HAVING AN ADJUSTABLE FLOAT

[72] Inventor: John J. Baruch, 36 Mulberry Court, Glenview, Ill. 60025

[22] Filed: May 11, 1970

[21] Appl. No.: 36,138

[52] U.S. Cl. .................. 340/244 A, 200/84 R, 73/322.5, 73/308, 73/309, 73/311
[51] Int. Cl. .................. G08b 23/00, G01f 23/08
[58] Field of Search .................. 340/244, 244 A–244 D; 200/61.45, 61.52, 84 R, 84 A, 61.42; 73/308, 309, 311, 322.5; 9/8

[56] References Cited

UNITED STATES PATENTS

| | | | |
|---|---|---|---|
| 2,536,273 | 1/1951 | Gahagan | 340/244 X |
| 2,023,461 | 12/1935 | Butler | 73/322.5 X |
| 2,029,405 | 2/1936 | Beadle | 73/322.5 X |
| 3,416,131 | 12/1968 | MacKenzie et al. | 340/244 C X |

Primary Examiner—John W. Caldwell
Assistant Examiner—William M. Wannisky
Attorney—Spector & Alster

[57] ABSTRACT

A device for indicating a low level in the reservoir of an automobile windshield washer system comprises a warning light on the vehicle's dashboard and a float-controlled switch that operates the warning light when the float drops to a predetermined level. At its lower end, the float has a series of end-to-end elements that are joined together by flangible connections so that one or more of the sections can be removed to shorten the float and allow it to be used in reservoirs of different depths.

2 Claims, 4 Drawing Figures

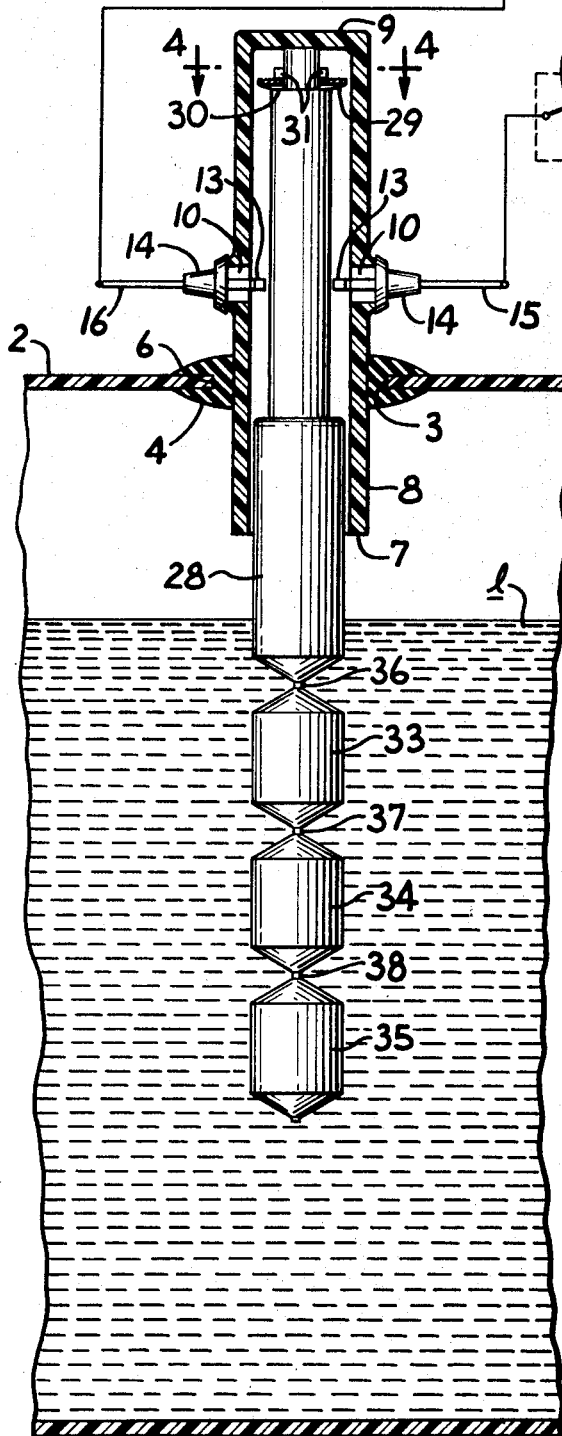

LIQUID LEVEL INDICATOR HAVING AN ADJUSTABLE FLOAT

BACKGROUND OF THE INVENTION

This invention relates to liquid level indicators, and more particularly to a device for indicating a low level of fluid in the reservoir of an automobile windshield washer system.

It is an object of this invention to provide a liquid level indicator of the type stated which is of relatively simple construction and is capable of easy installation in windshield washer fluid reservoirs of varying depths and capacities.

It is a further object of this invention to provide a liquid level indicator of the type stated that contains a warning light or other signalling device and a float-controlled switch that operates the signalling device when the float drops to a predetermined level responsive to the level of the fluid. The float is made longer than that which would be needed for the deepest commercially known washer fluid reservoir. However, the float has a series of end-to-end elements that are joined by frangible connections so that the length of the float can be shortened to a desired length in accordance with the depth of the particular container on which the device is installed. That desired float length is such that when the float drops to the predetermined level to close the switch, the bottom of the float will still be free of the bottom of the reservoir.

The attainment of the above and further objects of the invention will be apparent from the following description taken in conjunction with the accompanying drawing forming a part thereof.

In the drawing:

BRIEF DESCRIPTION OF THE DRAWING

FIG. 1 is a vertical sectional view and circuit diagram of an indicating device in accordance with the present invention;

FIG. 2 is an enlarged fragmentary sectional view of a portion of FIG. 1;

FIG. 3 is a fragmentary sectional view taken along line 3—3 of FIG. 2; and

FIG. 4 is an enlarged fragmentary sectional view taken along line 4—4 of FIG. 1.

DESCRIPTION OF THE PREFERRED EMBODIMENT

Referring now in more detail to the drawing, there is shown a fragmentary portion of a fluid container or reservoir 1, which may be a typical windshield washer fluid reservoir. The reservoir 1 conventionally has an opening (not shown) in the top wall 2 through which the reservoir is filled. Conventionally, also there may be a closure across the top opening and from which leads the fluid discharge line for the washer system. In accordance with the present invention, a hole 3 is formed at a suitable place on the top wall 2 for receiving a rubber or plastic grommet 4 that is peripherally grooved at 6 to receive the adjacent part of the top wall 2.

Fitted into the grommet 4 is an open bottom plastic housing 7 having an annular side 8 and a top 9. The fit between the grommet 4 forms a fluidtight seal and the position of the housing 7 is adjustable to vary the extent to which the housing 7 projects below the top wall 2. Formed in the side 8 are opposed elongated slots 10, 10 around which the exterior of the side 8 is molded with an annular resilient beads 12. A pair of opposed electrical switch contacts 13,13 are disposed within the interior of the housing 7. Each contact 13 is preferably generally T-shaped and has a plastic retainer 14 molded therearound. Lead wires 15,16 16 may be suitably connected to the respective contacts 13,13. These connections may be within the retainers themselves.

In installing a switch contact 13 in the housing 7, the head of "T" is turned so that it coincides with the longer (i.e., vertical) dimension of the slot 10, enabling the contact to pass therethrough. Pressure is then applied from he retainer 14 against the bead 12 causing the latter to yield and move the edge 17 of the head of the contact clear of the side wall 8. The retainer 14 is then rotated a quarter of a turn and released causing the edge 17 to engage the inside of the wall 8.

The lead wire 15 is connected through a level-check switch 19 to a warning lamp 20 that may be located on the dashboard of the vehicle. The switch 19 and lamp 20 may be contained within a housing 22. Lead wire 16 is connected to a fuse 23, which is one of a number of fuses in the conventional automotive fuse holder 24, that includes an ignition circuit fuse 25. Some of the fuses are directly connected to the vehicle battery 26; however, the fuse 23 is one that is connected to the battery 26 through the automobile ignition switch 27 of the conventional internal combustion engine type automobile.

Within the housing 7 is a float 28 of a suitable lightweight material. The float may be a hollow plastic member. At its upper end the float 28 has an annular bridging switch contact 29 that closes the circuit between the contacts 13,13 when the liquid $l$ in the reservoir 1 drops to a predetermined level. With the ignition switch 27 closed and the liquid at or below this predetermined level, closing the switch 22 causes the warning lamp 20 to glow, indicating a low level of liquid in the reservoir 1. If desired the switch 19 may be eliminated so that the lamp 20 stays on when the liquid level is low and so long as the ignition 27 switch is closed.

The upper end of the float 28 has opposed ribs 31,31 which are received in notches 32,32 in the bridging contact 29 when the latter is slipped over the end of the float upon assembly of the contact 29 and float 28. When the contact 29 has moved under the ribs 31,31, and onto the seat 30 the contact 29 may be rotated ninety degrees to prevent its separation from the float. Also, the contact 29 may be of such interior diameter as to grip frictionally the part of the upper end of the float that is above the seat 30.

The lower end of the float 28 has a series of end-to-end elements 33, 34, 35, etc., which, for convenience, may be of equal mass and volume. The elements are joined together along frangible bridges 36,37,38, etc., which may be regions of weakness or thin sections in the molded float piece. Ordinarily there are enough elements 33,34,35, etc., on the float to enable it to be used in the deepest commercially known reservoir 1. However, for reservoirs of shorter depth it is merely necessary to break off the minimum number of the elements, such that the bridging contact 29 will engage the contacts 13,13 before the float strikes the bottom of the reservoir.

Having described the principles of the invention, what is claimed is:

1. A depletion indicator for indicating the need for refill of windshield washing liquid in a reservoir in an automobile, said indicator comprising: a housing, means for mounting the housing on a reservoir of windshield washing liquid in an automobile, the housing having an opening that opens into the reservoir, and the housing making a fluidtight fit with the reservoir, a float extending from the housing through the opening thereof that opens into the reservoir and movable in response to changes in liquid level in the reservoir, an electric circuit including signalling means for signalling depletion of windshield washing liquid in said reservoir, said circuit being controlled by cooperating electric switch contacts that are in the housing and controlled by the float, and means whereby the length of the float may be varied to accommodate the indicator to reservoirs of various depths, said last means comprising a series of elements any number of which may be separated from the remainder of the structure constituting the float, each element being connected to the preceding element of the float structure by a frangible bridge that is ruptured to separate the element from the float structure.

2. A liquid level indicator according to claim 1 in which the elements are joined in end-to-end relationship by frangible bridges are so that successive removal of elements successively shortens the length of the float structure.

* * * * *